(No Model.)
J. W. GILBERT & H. H. PARKER.
GATE.
No. 602,984. Patented Apr. 26, 1898.
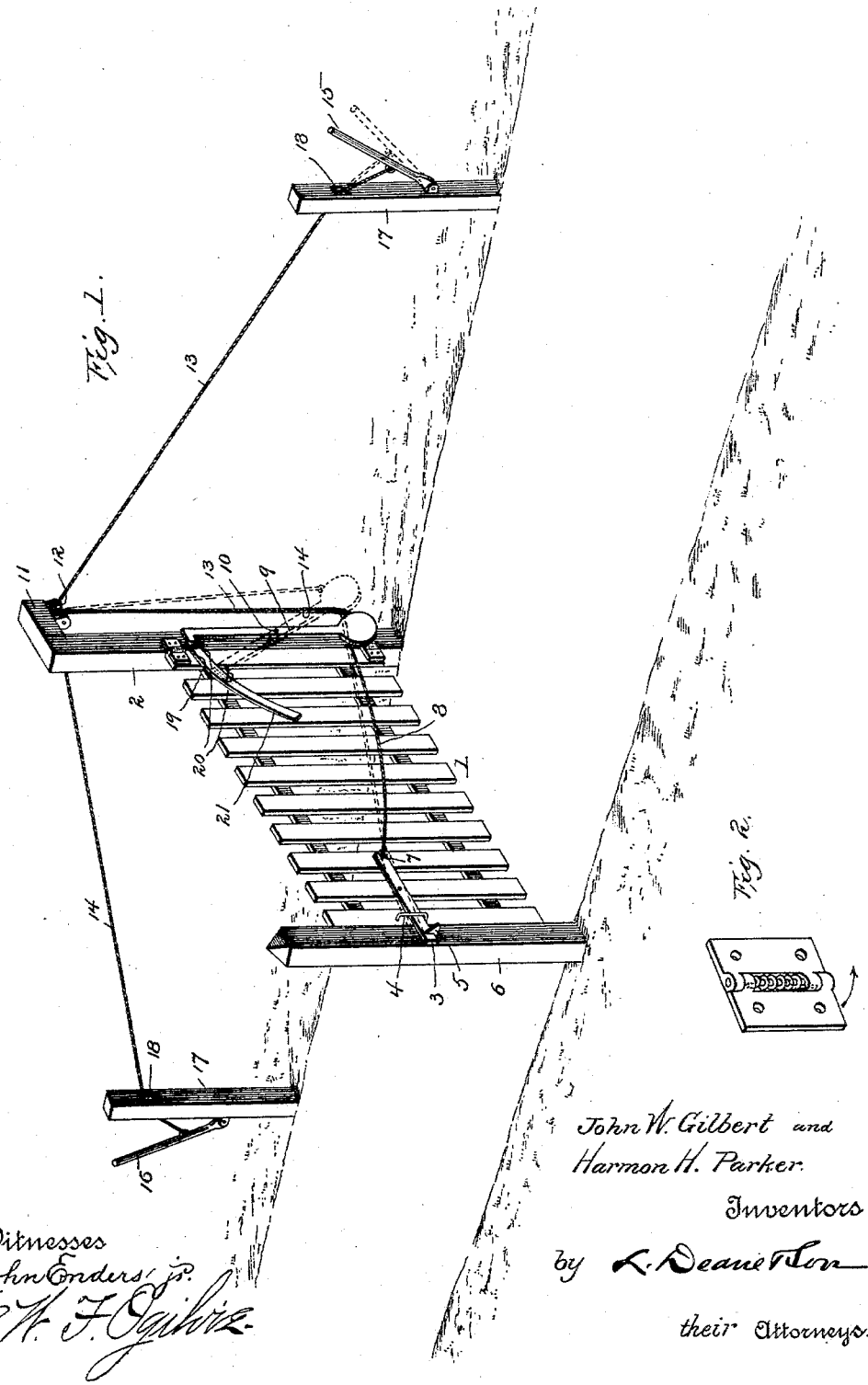
John W. Gilbert and
Harmon H. Parker.
Inventors
Witnesses
John Enders, Jr.
R. W. F. Ogilvie
by L. Deane Ton
their Attorneys.

UNITED STATES PATENT OFFICE.

JOHN W. GILBERT AND HARMON H. PARKER, OF CREEK, TEXAS.

GATE.

SPECIFICATION forming part of Letters Patent No. 602,984, dated April 26, 1898.

Application filed January 27, 1897. Serial No. 620,922. (No model.)

*To all whom it may concern:*

Be it known that we, JOHN W. GILBERT and HARMON H. PARKER, citizens of the United States, residing at Creek, in the county of Houston and State of Texas, have invented certain new and useful Improvements in Gates; and we do hereby declare the following to be a full, clear, and exact description of the invention, such as will enable others skilled in the art to which it appertains to make and use the same.

Our invention relates to gates, and is more particularly a mechanism for opening and closing the same, whereby those wishing to enter the said gate may unlatch and open it without alighting from the vehicle.

We will first describe our invention with the aid of the accompanying drawings, in which—

Figure 1 is a perspective view of a gate constructed in accordance with our invention. Fig. 2 is a perspective view, on an enlarged scale, of one of the spring-hinges.

1 is a gate hinged by ordinary spring-hinges to the upright 2 and having the pivoted latch 3 and the guide-iron 4 therefor. The latch 3 is adapted to engage the hook 5 of the upright post 6, and at its free end 7 is coupled by the cord 8 or similar device to the free end of the gravitating arm 9, pivoted to the upright 2 at 10.

Projecting laterally from the top of the upright 2 is an arm 11, at the end of which is secured the double sheave 12. Secured also to the free end of the weight-arm 9 are the cords 13 and 14, passing over the pulleys of the sheave 12 and in opposite directions to the upright posts 17, disposed some twenty feet or more on each side of the gate. The said wires 13 and 14 pass over the pulleys 18 of the said posts 17.

Secured to the weight-arm 9 is a projecting arm 19, provided with a friction-roll 20, adapted to impinge upon the plate 21, secured to the gate.

To open the gate, one of the levers 15 or 16 is actuated from the vehicle, which, through the medium of the cord or rope connected therewith, will elevate the lower end of the weighted arm 9, and through the cord or rope of the latter the latch 3 will be thrown out of engagement with the hook 4. The lever 15 or 16, as the case may be, is then released, when the gravitating lever will quickly drop and before the latch can drop into the hook the spring-hinges will throw the gate open. After the vehicle has passed through the gateway the opposite lever is operated, which in turn will actuate the gravity-lever, causing the friction-roller on the upper end thereof to strike the curved plate 21, secured to the gate, closing the latter, when the latch will engage with the hook 4 and hold the gate in its closed position.

Having fully described our invention and its operation, we will now define the subject-matter for which we desire to secure Letters Patent and claim—

1. The combination with the post, the sheaves connected with the upper end thereof, the gate, the spring-hinges connecting said post and gate, the latch pivoted to the gate, the post having a hook with which said latch engages, and the curved plate secured to said gate, of the weighted gravity-lever, the roller at the upper end thereof, the rope connecting said lever and the latch, the ropes passing over the said sheaves, and attached to the gravity-lever, the levers with which said ropes are connected, the posts to which said levers are pivoted, and the pulleys connected with said posts, substantially as described.

2. A gate mechanism, comprising a gate, a latch therefor, a pivoted weight-arm, cords coupling said weight-arm to the latch and gate and to actuating-levers, and uprights to which said actuating-levers are pivotally secured, combined with the arm 19 projecting from said weight-arm, and the roll 20 pivoted to said arm, in the manner and for the purpose described.

In testimony whereof we affix our signatures in presence of two witnesses.

JOHN W. GILBERT.
HARMON H. PARKER.

Witnesses:
GEORGE W. DAVISON,
R. H. FURLOW.